US006860145B2

(12) United States Patent
Bergst et al.

(10) Patent No.: US 6,860,145 B2
(45) Date of Patent: Mar. 1, 2005

(54) CHASSIS DYNAMOMETER

(75) Inventors: Allen B Bergst, Menomonee Falls, WI (US); John R Childers, West Bend, WI (US); John F Petelinsek, Menomonee Falls, WI (US); Alan D Petelinsek, Oconomowoc, WI (US); Daniel D Strain, West Allis, WI (US); Gregory Johnson, Merton, WI (US)

(73) Assignee: Power Test, Inc., Menomonee Falls, WI (US)

( * ) Notice: Subject to any disclaimer, the term of this patent is extended or adjusted under 35 U.S.C. 154(b) by 0 days.

(21) Appl. No.: 10/413,123

(22) Filed: Apr. 14, 2003

(65) Prior Publication Data

US 2004/0200272 A1 Oct. 14, 2004

(51) Int. Cl.⁷ .................................................. G01L 5/28
(52) U.S. Cl. .......................................... 73/123; 73/862
(58) Field of Search ........................... 73/117, 123, 862, 73/862.08, 862.12, 862.14, 862.09, 862.28, 862.18, 126

(56) References Cited

U.S. PATENT DOCUMENTS

| | | |
|---|---|---|
| 3,020,753 A | 2/1962 | Maxwell |
| 3,277,703 A | 10/1966 | Cline |
| 3,289,471 A | 12/1966 | Maxwell |
| 3,490,276 A | 1/1970 | Maxwell et al. |
| 3,554,023 A | 1/1971 | Geul |
| 3,979,950 A | 9/1976 | Maxwell |
| 4,050,299 A | 9/1977 | Maxwell |
| 4,450,728 A | 5/1984 | D'Angelo et al. |
| 4,468,955 A | 9/1984 | Yamasaki et al. |
| 4,483,204 A | 11/1984 | Warsaw |
| 4,688,419 A | 8/1987 | D'Angelo et al. |
| 4,899,595 A | 2/1990 | Warsaw |
| 5,010,763 A | 4/1991 | Schneider |

(List continued on next page.)

OTHER PUBLICATIONS

Dynamic Corporation, Maxwell Dynamometer Model 9580, Instruction –Maintenance Manual, undated, all pages, Kenosha, WI, United States.

(List continued on next page.)

Primary Examiner—Edward Lefkowitz
Assistant Examiner—Takisha Miller
(74) Attorney, Agent, or Firm—LaFollette Godfrey & Kahn; Sonali S. Srivastava

(57) ABSTRACT

A motorized chassis dynamometer machine. In one embodiment, the dynamometer machine includes a fixed frame assembly. At least one roller assembly is mounted on the fixed frame assembly. At least one independent motor assembly is connected to each roller assembly. The independent motor assembly is used for driving the roller assembly. At least one independent loading dynamometer assembly capable of measuring the vehicle input power at each roller assembly is coupled to each roller assembly. In a preferred embodiment, the dynamometer assembly is only operable for loading each independent roller assembly, while the motor assembly is operable for driving each independent roller assembly. The machine has at least one motor controller capable of controlling each independent motor assembly and at least one dynamometer controller capable of controlling each independent dynamometer assembly. Each roller assembly, motor controller and dynamometer controller are in turn controlled and manipulated by an overall controller. The dynamometer machine may further include a torque sensor for each motor assembly and each dynamometer assembly. The torque sensors are used to measure torque reaction, each torque sensor independently measuring torque for each of the roller assemblies.

16 Claims, 8 Drawing Sheets

U.S. PATENT DOCUMENTS

| | | | |
|---|---|---|---|
| 5,193,386 A | | 3/1993 | Hesse, Jr. et al. |
| 5,375,461 A | | 12/1994 | Suzuki |
| 5,419,192 A | | 5/1995 | Maxwell et al. |
| 5,445,013 A | * | 8/1995 | Clayton et al. ............... 73/117 |
| 5,447,060 A | * | 9/1995 | Smith et al. .................. 73/117 |
| 5,450,748 A | | 9/1995 | Evans et al. |
| 5,531,107 A | * | 7/1996 | Ganzhorn, Jr. ................ 73/117 |
| 5,844,145 A | | 12/1998 | D'Angelo |
| 6,257,054 B1 | | 7/2001 | Rostkowski et al. |

OTHER PUBLICATIONS

MD100 Chassis Dynamometer, http://www.mustang-dyne.com/ChassisDyno/md100.htm, Feb. 10, 2003, all pages, United States.

MD250 Chassis Dynamometer, http://www.mustang-dyne.com/ChassisDyno/md250.htm, Feb. 10, 2003, all pages, United States.

* cited by examiner

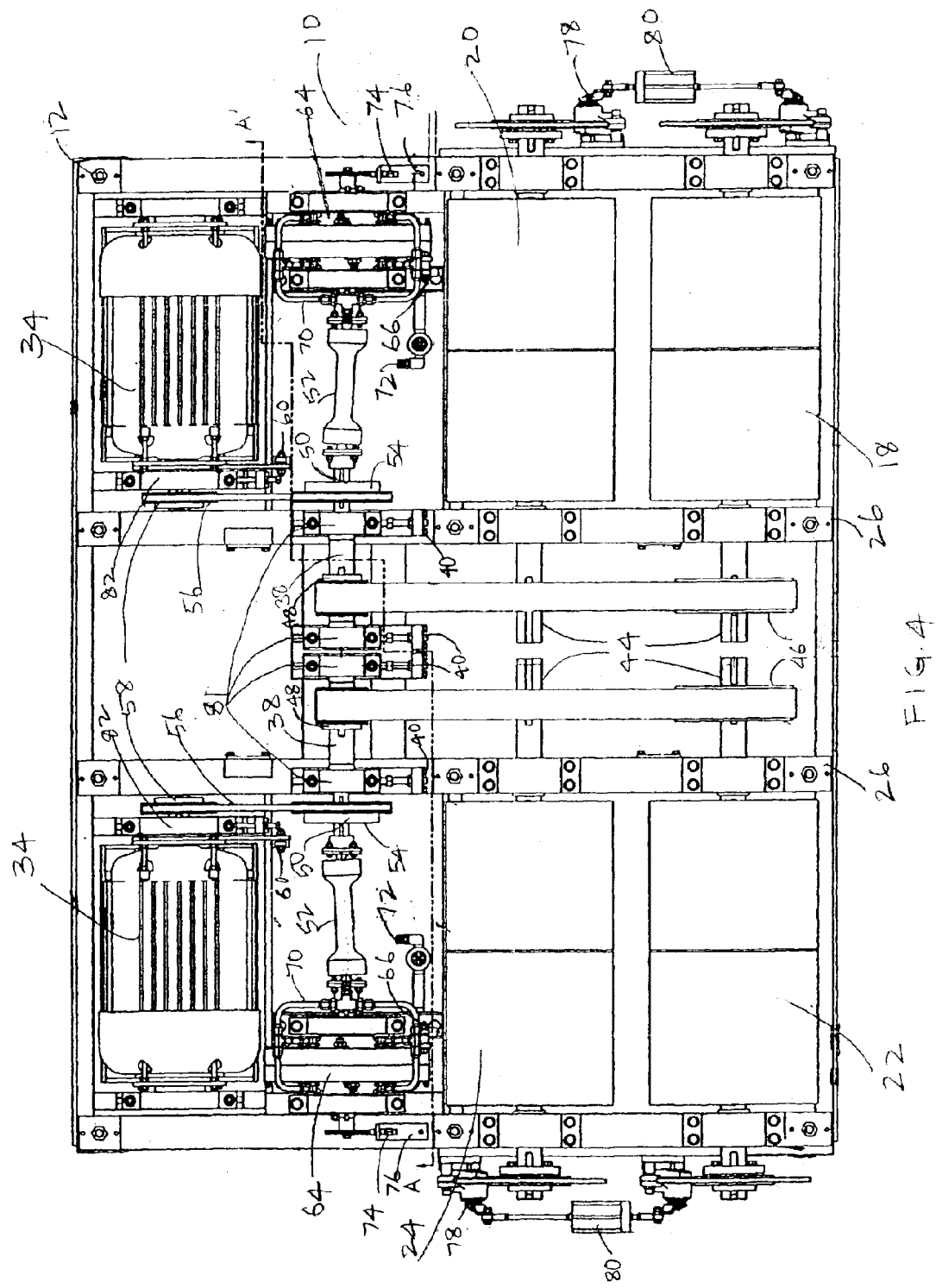

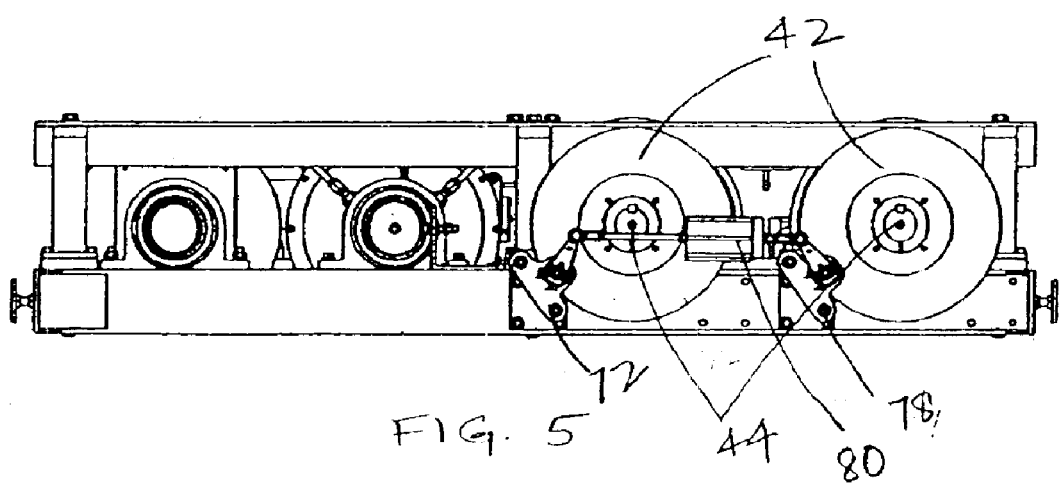

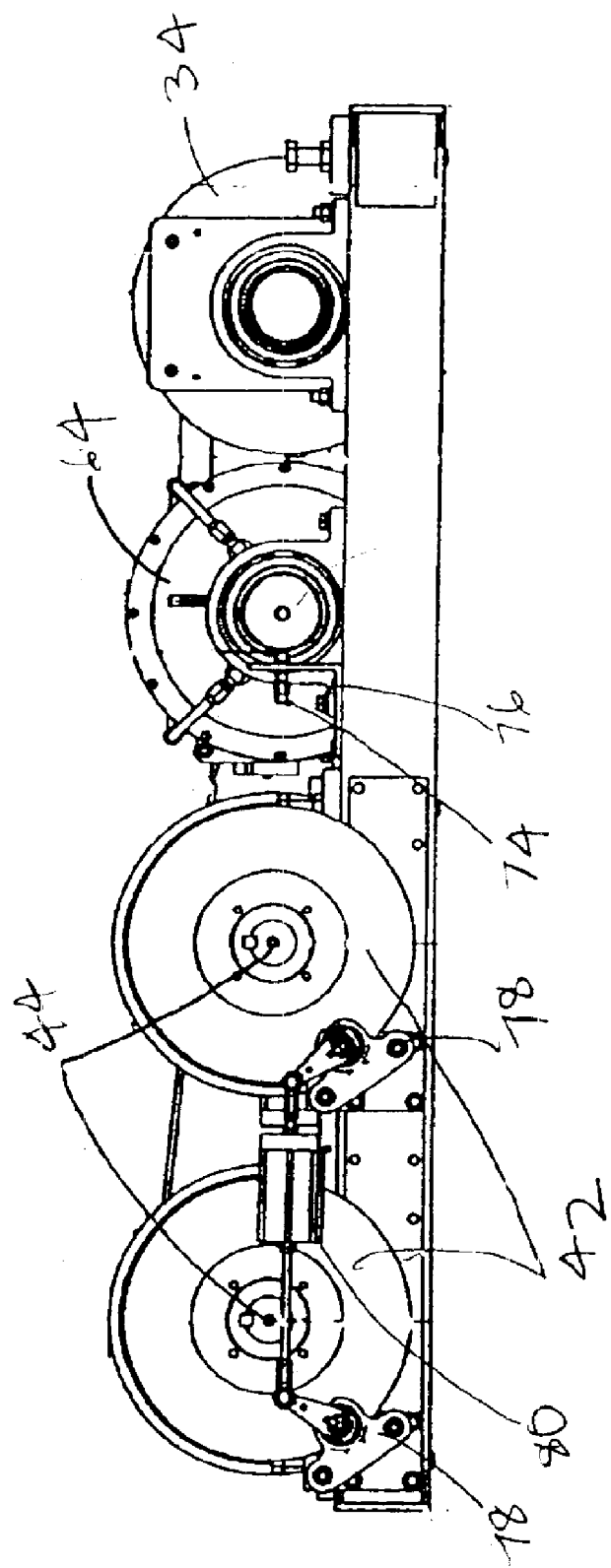

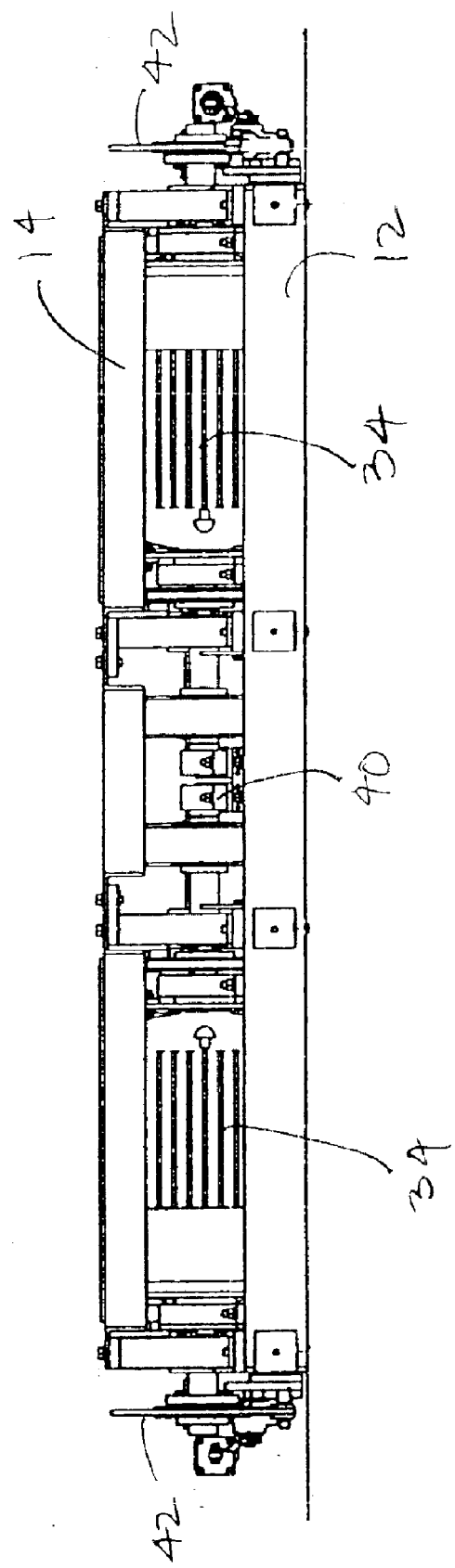

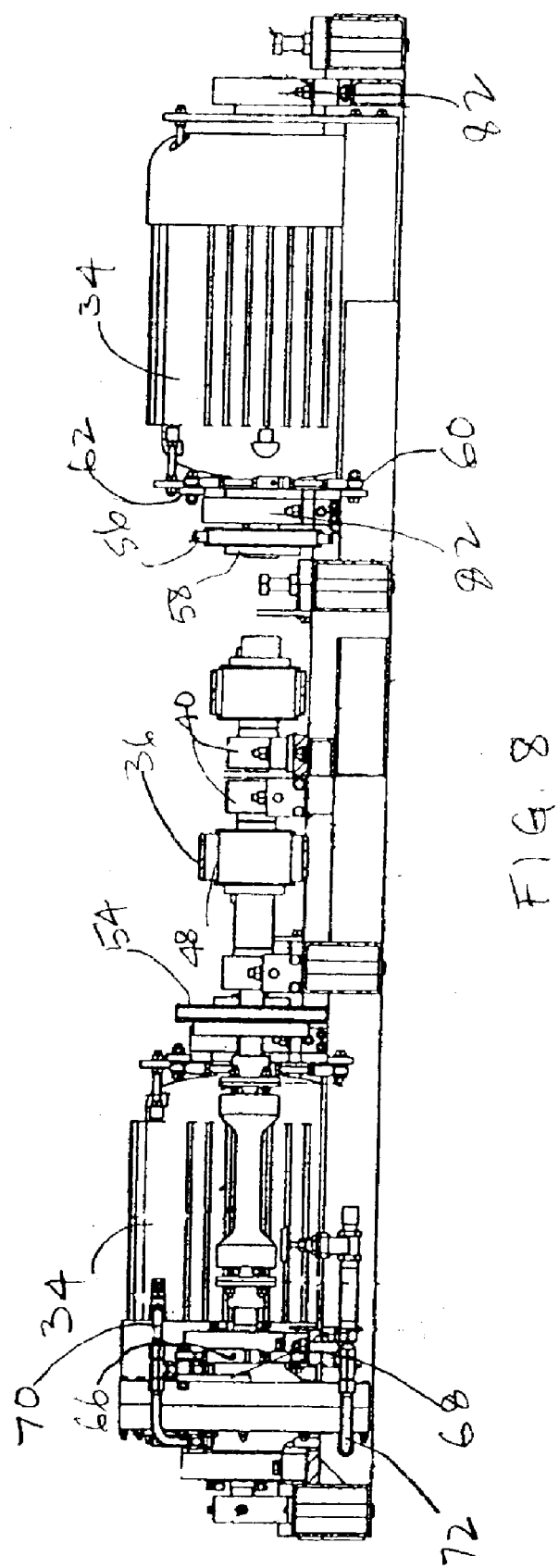

CHASSIS DYNAMOMETER

BACKGROUND OF THE INVENTION

This invention generally relates to dynamometers and specifically to a chassis dynamometer for transit vehicles.

The art of making various dynamometers has existed for decades. Continuous improvement in the construction of dynamometers for activities including brake testing, performance testing and emissions testing is evidenced by a series of issued patents including U.S. Pat. No. 5,375,461 to Suzuki, U.S. Pat. No. 4,450,728 to D'Angelo et. al., U.S. Pat. No. 4,468,955 to Yamasaki et. al., U.S. Pat. No. 4,688,419 to D'Angelo et al., U.S. Pat. No. 4,870,585 to Manzolini, U.S. Pat. No. 5,010,763 to Schneider, U.S. Pat. No. 3,277,703 to Cline, U.S. Pat. No. 3,554,023 to Geul, U.S. Pat. No. 6,257,054 to Rostkowski et. al., U.S. Pat. No. 5,193,386 to Hesse, Jr. et. al., U.S. Pat. No. 5,844,145 to D'Angelo, U.S. Pat. No. 5,450,748 to Evans et al., U.S. Pat. No. 4,483,204 to Warsaw, U.S. Pat. No. 4,899,595 to Warsaw, U.S. Pat. No. 3,289,471 to Maxwell, U.S. Pat. No. 3,490,276 to Maxwell et. al., U.S. Pat. No. 5,419,192 to Maxwell et. al., U.S. Pat. No. 4,050,299 to Maxwell, U.S. Pat. No. 3,979,950 to Maxwell and U.S. Pat. No. 3,020,753 to Maxwell.

The use of chassis dynamometers for measuring various variables in automotive performance is widely known in the industry. A chassis dynamometer generally includes a frame, at least one set of rollers supported on a frame and a dynamometer attached to the rollers for the purpose of road load stimulation.

For brake testing, general motoring and driving of chassis dynamometer rollers, much less power is required than is necessary for load testing to measure the vehicle power. Frequently, machines use a motor or electric dynamometer that is capable of both functions, i.e. motoring and absorbing power with the chassis dynamometer. However, with the advent of higher horsepower vehicles, it has become necessary to have machines that require greatly oversized motors or electric dynamometers to provide full vehicle power absorption while still providing the lesser power required for driving the rollers. An additional disadvantage of using a large motor or electric dynamometer is the necessity to dissipate heat generated through a resistive load bank or to regenerate the absorbed power as electrical power. Both these functionalities add undesirable complexity and additional cost to the machine.

Accordingly, the need exists for a motoring chassis dynamometer that is very economic in construction. The motoring chassis dynamometer must be modularly built such that the machine may be easily assembled transported and installed as modules. Similarly, if any repair, maintenance or adjustment is required on the chassis dynamometer, the chassis dynamometer may be capable of easy modular disassembly, repair, maintenance and adjustment. Also, the need exists for a chassis dynamometer to provide test performance surpassing the current and anticipated vehicle capability so that tests of vehicle performance, such as brake testing, transmission testing and full engine power testing for higher horsepower vehicles, can be performed without greatly over-sizing the motor or electric dynamometer. The need also exists to offer alternatives to the currently existing dynamometers to provide the same or greater performance by using a reduced size motor and appropriately sized dynamometer. Finally the need exists to construct chassis dynamometers to allow for testing of both low horsepower and high horsepower vehicles by decreasing construction and equipment cost.

SUMMARY OF THE INVENTION

The present invention provides a motorized chassis dynamometer machine. In one embodiment of the present invention, the chassis dynamometer includes a fixed frame assembly. At least one roller assembly is mounted on the fixed frame assembly. Further, at least one independent motor assembly is connected either directly or indirectly to each roller assembly. The independent motor assembly is used for driving the roller assembly and or the dynamometer. At least one independent loading dynamometer assembly capable of measuring power absorption for each of the roller assemblies is coupled either directly or indirectly to each roller assembly and or the motor. In a preferred embodiment, the dynamometer assembly is only operable for loading each independent roller assembly, while the motor assembly is operable for driving each independent roller assembly. Moreover, the machine has at least one motor controller capable of controlling each independent motor assembly and at least one dynamometer controller capable of controlling each independent dynamometer assembly. Additionally, each roller assembly, motor assembly and dynamometer assembly are controlled and manipulated by a means for controlling and manipulating each such assemblies.

In another embodiment of the present invention, the chassis dynamometer machine also includes a moveable frame assembly. In yet another embodiment of the present invention, the dynamometer machine further includes a torque sensor for each motor assembly and each dynamometer assembly. The torque sensors are used to measure torque reaction. Each torque sensor independently measures torque for each of the roller assemblies.

Various other features, objects, and advantages of the invention will be apparent to those skilled in the art from the following detailed description, including illustrative examples setting forth how to make and use the invention.

BRIEF DESCRIPTION OF THE DRAWINGS

FIG. 4 is a top plan view of the machine as depicted in the embodiment described by FIG. 3.

FIG. 5 is a right side plan view of the machine as depicted in the embodiment described by FIG. 1.

FIG. 6 is a left side plan view of the machine as depicted in the embodiment described by FIG. 3.

FIG. 7 is a rear end plan view of the machine as depicted in the embodiment described by FIG. 1.

FIG. 8 is a sectional view of the machine as depicted in the embodiment described by FIG. 4, along the lines A–A'.

DETAILED DESCRIPTION OF THE INVENTION

Figure 1:
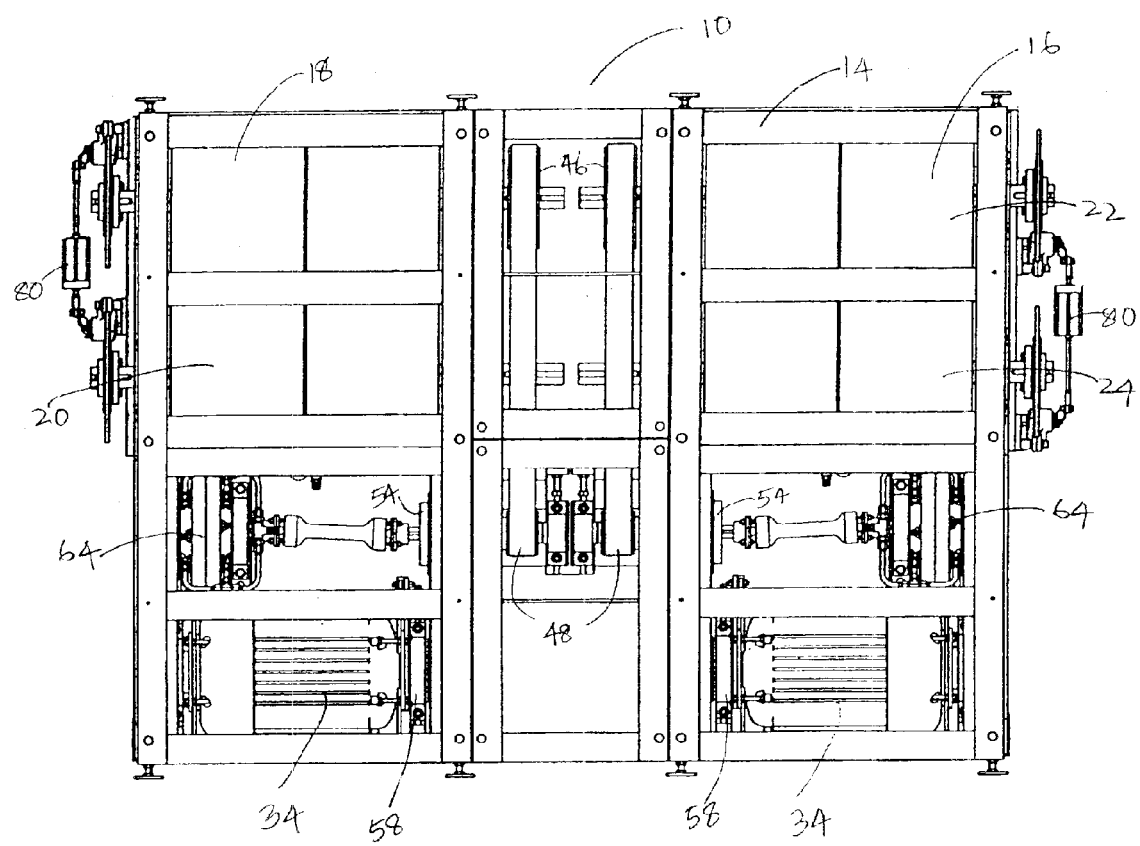
FIG. 1 is a top view of the preferred embodiment of the motorized chassis dynamometer machine with an upper structure assembly mounted on a lower structure assembly.

Referring now to the drawings and in particular FIGS. 1, 2, 3 and 4, one preferred embodiment of a motorized chassis dynamometer machine 10 generally comprises a fixed frame assembly 11 and a movable frame assembly (not shown). Since the fixed frame assembly 11 and the movable frame assembly are identical in operation to each other except for the mobility of the movable frame assembly, only the operational features and functionality of the fixed frame assembly 11 will be discussed in detail. Methods for operating a movable frame relative to a fixed frame assembly are known to one of ordinary skill in the art.

The fixed frame assembly 11 generally includes a lower structure assembly 12 and an upper structure assembly 14. The upper structure 14 and the lower structure 12 are removably held together by traditional means known to one of ordinary skill in the art. In one preferred embodiment, the upper and lower structures 14, 12 are removably held together by nuts and bolts. The upper and lower structures 14, 12 are assembled such that the upper structure 14 is separable from the lower structure 12 for any maintenance and adjustment of parts contained within the upper and lower structure assemblies 14, 12.

The lower structure 12 generally forms the substrate upon which at least one roller assembly 16 is positioned. In one preferred embodiment of the present invention, only a single roller assembly 16 is positioned on the lower structure 12. In another preferred embodiment, there are at least four roller assemblies 16 positioned on the fixed frame 11, namely left front roller 18, left rear roller 20, right front roller 22 and right rear roller 24. Since the left rollers 18 and 20 are operationally substantially identical to the right rollers, 22 and 24 respectively, only the left rollers, 18 and 20 of the machine 10 will be described in operational detail.

In a preferred embodiment, the fixed frame assembly 11 is held in position against concrete walls of a below grade rectangular opening with the aid of any suitable permanent or removable structure such as jacking pad 28, jacking nut 30 and jam nut 32. Further, left front roller 18 and left rear roller 20 are positioned on the lower substrate with the aid of mounting rails 26. Mounting rails 26 are held in position by means traditionally known to one of ordinary skill in the art. The mounting rails 26 are so assembled that parts mounted on the rails 26 may be easily removed for maintenance and adjustment. Overall, the construction of the machine is modular so that uncomplicated assembly and disassembly of these modules is possible for easy transportation, installation, repair, maintenance and adjustment of the machine.

Further, in one preferred embodiment of this invention, each pair of left rollers 18, 20 and right rollers 22, 24 form a wheel cradle and are coupled with at least one independent motor assembly 34 for each. In another preferred embodiment, a single roller assembly 16 is used to allow a wheel to rest upon it rather than on a cradle created by a pair of roller assemblies 16. Preferably, the independent motor assembly 34 is capable of operating at variable speeds and is functional in driving the left and right front rollers 18 and 22 via an arrangement well known to one of ordinary skill in the art. In a preferred embodiment, variable speed motor assembly 34 is coupled to the front rollers 18 and 22 with the aid of a first transmission belt 36, which is preferably a cog-toothed polymer power transmission belt or any equivalent thereof.

The front rollers 18 and 22 are each connected to a pulley shaft assembly 38 as also shown in FIG. 4. The pulley shaft assembly 38 is journaled on the mounting rail 26, and in one preferred embodiment, the shaft assembly is journaled using a pillow block bearing 81 and jacking block assembly 40.

The pillow block jacking block assembly 40 functions as a mount for holding the pulley shaft assembly 38 in position and providing alignment of the first power transmission belt 36. Various methods for assembly of pillow block jacking block assembly 40 and pulley shaft assembly 38 are known to one of ordinary skill in the art.

Referring now to FIGS. 5 and 6, each of the left, right, front and rear rollers 18, 20, 22 and 24 are allowed to rotate along a first independent central axle 44. Further, a first pulley wheel 46 is mounted on the inner end of first central axles 44 of the front rollers 18 and 22. In a preferred embodiment, the pulley wheel 46 has mating cogs (not shown) such that in operation, the pulley wheel 46 is capable of engaging the first transmission belt 36.

The pulley shaft assembly 38 as shown in FIG. 4 also has a second pulley wheel 48 attached to it as also seen in FIGS. 7 and 8. The pulley shaft assembly 38 also has a drive flange 50 attached to it to allow the pulley shaft 38 to be further attached to a drive shaft assembly 52 or any equivalent thereof. The drive shaft assembly 52 is angularly positioned with respect to the axis of the pulley shaft 38. The orientation of the drive shaft assembly 52 and the pulley shaft 38, in one preferred embodiment is generally less than 10°. In a preferred embodiment, the pulley shaft assembly 38 further includes a third pulley wheel 54, which in turn is rotated with the aid of a second power transmission belt 56, preferably a cog-toothed polymer belt or the equivalent thereof, and the fourth pulley wheel 58 that is attached to the motor 34. The fourth pulley wheel 58 rotates when the motor 34 is powered.

In operation, when the motor 34 is powered for driving the rollers with the aid of electrical current, the fourth pulley wheel 58 attached to the motor 34 rotates. The fourth pulley wheel 58, which is coupled to the third pulley wheel 54 with the aid of second transmission belt 56, in turn rotates the third pulley wheel 54. Since the third pulley wheel 54 is attached to the pulley shaft assembly 38 along with the second pulley wheel 48, the second pulley wheel 48 rotates with the third pulley wheel 54. Since the second pulley wheel 48 is coupled to the first pulley wheel 46 with the aid of the first transmission belt 36, the first pulley wheel 46 also in turn rotates. Further, since the first pulley wheel 46 is coupled to the first central axle 44 upon which the front rollers 18, 22 rotate, when either or all of the appropriate motors 34 are powered, the left front and right front rollers 18, 22 also rotate accordingly. Therefore, the motor 34 functions to operate as the driver for the front rollers, 18, 22. Moreover, the front rollers 18 and 22 may be driven at the same speed if the independent motor 34 associated with each left and right side are controlled in this manner, regardless of the required power to do so. This feature allows the difference in torque to be measured independently, thereby allowing performance characteristics to be measured. When desirable, the dynamometers 64 of right- and left-hand sides can be controlled to apply load in a manner that maintains equal speed on the front rollers 18 and 22 thereby allowing the measurement of vehicle power at each wheel as it contacts the roller assembly 16.

Figure 2:
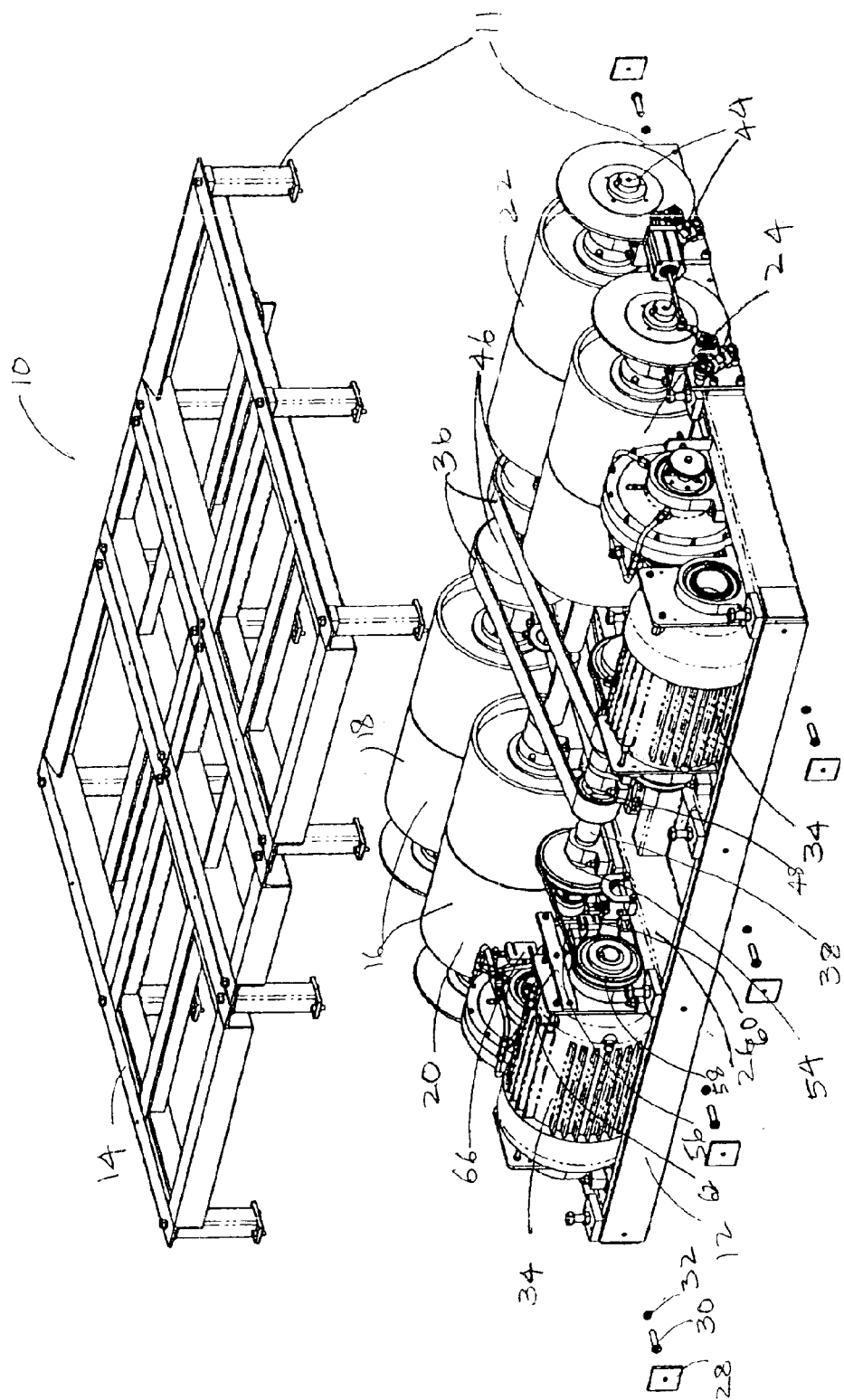
FIG. 2 is a partially exploded perspective view of the machine as shown in FIG. 1, viewed from the motor end of the machine with the upper structure partially removed from the lower structure assembly.

The motor assembly 34 is journaled on the mounting rails 26. In a preferred embodiment, the motor assembly 34 is trunnion-mounted on the mounting rails 26. In a preferred embodiment, the motor assembly is trunnion-mounted using a pillow block jacking assembly 82. Further, as seen in FIGS. 2, 4 and 8, the motor assembly 34 is coupled to a first torque arm assembly 62, which in turn is restrained by a first torque sensing device 60. In operation, when the motor assembly 34 is powered for driving the front rollers 18, 22, the motor 34 exerts torque on the roller assembly, and the resultant force is resisted and measured through the use of the journaled motor assembly 34 connected to the torque sensing device 60 by the torque arm 62. In a preferred embodiment, a strain gauge load cell is used for measuring the resultant force.

The dynamometer assembly is also journaled on the mounting rails 26. In a preferred embodiment, the dynamometer assembly 64 is trunnion-mounted on the mounting rail 26, which is coupled to the drive shaft assembly 52. When the wheels of a driven axle of a vehicle are positioned upon the roller assembly 16 and caused to rotate, the vehicle rotates the front and the rear rollers 18, 20, 22, 24. When the front rollers 18, 22 rotate, the first pulley wheel 46 rotates, and with the aid of the first transmission belt 36, the second pulley wheel 48 rotates. Since the second pulley wheel 48 is coupled to the drive shaft assembly 52 via a common axle 38, the drive shaft assembly 52 also rotates. This rotation of the drive shaft assembly 52 exerts torque on the dynamometer assembly 64. Since the dynamometer assembly 64 is trunnion-mounted, the reactive force is measured through the use of a second torque arm assembly 68 connected to a second torque sensing device 66 as seen in FIGS. 2 and 8. In a preferred embodiment, the second torque-sensing device is a strain gauge load cell.

Resistive force to the rotation of the roller assemblies 18, 22 is caused by the application of load by the dynamometer assembly 64 and may be created by any method known to one of ordinary skill in the art. In a preferred embodiment, a water brake dynamometer 64 is used, although any form of dynamometer may be substituted. In water brake dynamometer 64, water is pumped into the dynamometer assembly 64 through the inlet assembly 70. The flow of water creates load within the dynamometer assembly 64. This flow of water serves the dual purpose of allowing the controlled application of a measurable resistance to the rotating roll assemblies 18, 22 by controlling the flow of water to the dynamometer 64, while at the same time allowing for the dissipation of heat proportional to the applied load. The water is then removed and recycled from the dynamometer assembly via an exhaust assembly 72.

In another preferred embodiment, a non-motoring dynamometer assembly 64 is used to apply a controlled and measurable resistance in order to measure the test vehicle's power output at the rollers 18, 20, 22 and 24.

Figure 3:
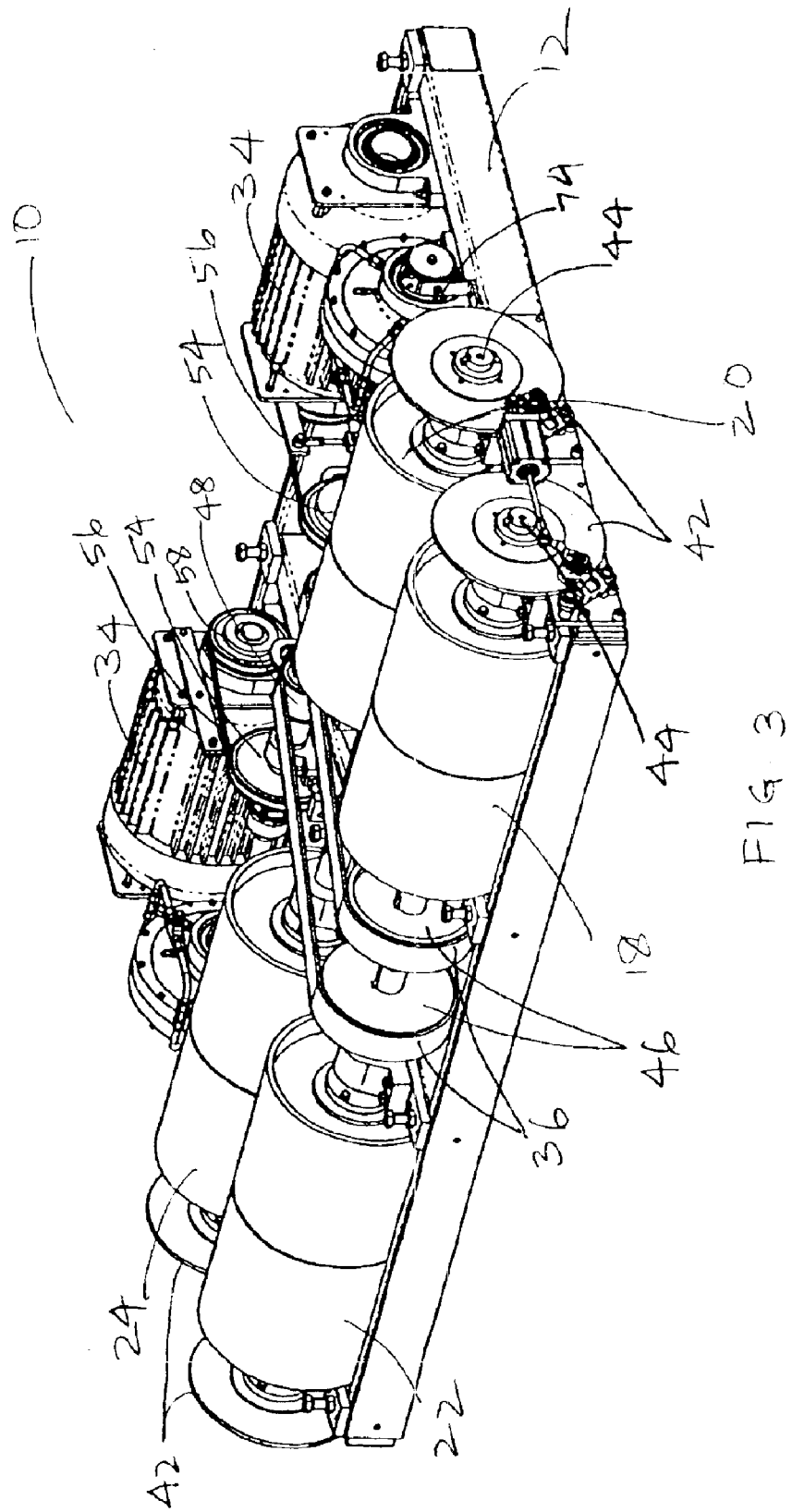
FIG. 3 is a perspective view of the machine as viewed from the roller end of the machine, with the upper structure completely removed from the lower structure.

In yet another preferred embodiment, a speed sensor assembly 74 is attached to each of the dynamometer assemblies 64, as shown in FIGS. 3, 4 and 6. Methods of measuring speed are widely known to one of ordinary skill in the art. The speed sensor 74 measures the speed of the roller assembly 16 as the result of the combined assembly of the dynamometer 64, the motor 34 and the roller assembly 16 coupled through the use of the two transmission belts 36, 56, as described above.

The front rollers 18 and 22 and the rear rollers 20 and 24 further preferably include brake assemblies 78 as shown in FIGS. 4, 5, 6 and 7. The rollers 18, 20, 22, 24 are coupled to a disc brake 42. Each roller may be equipped with a brake assembly or assemblies, of any form known to one of skill in this art. In a preferred embodiment, large disc brakes are used for easy vehicle mounting and dismounting on the machine 10. The brake rotors may also serve to increase the rotating mass of the system, thereby aiding in vehicle shifting and simulating vehicle inertia. In a preferred embodiment, the brake caliper assemblies share one common actuator between each of the calipers on front rollers 18 and 22 and the rear rollers 20 and 24 and use a pneumatic cylinder 80 for actuation, although other types of actuators may also be used.

The combination of a motor 34 for driving and a dynamometer 64 for loading each of the independent roller 16, is controlled by a standard personal computer (PC) interacting with an intelligent motor controller for each of the motors 34 and a load control device for each of the dynamometers 64. Individual feedback of torque from the motors 34 and dynamometers 64 and of the speed of rotation for each of the individual driven rollers 18 and 22 is used in computational adjustment and measurement of applied load or motoring. Through different modes of operation including load roll speed equalization from roller to roller, torque equalization from roller to roller and independent roller operation whether in load or drive mode, information is collected by the PC where it can be displayed, recorded, manipulated and analyzed.

A hand held display and control interface device may be used to allow remote operation and display of the computer controlled features.

Overall, for brake testing and general motoring/driving of the chassis dynamometer machine 10, much less power is required than is necessary for testing the vehicle power. Use of a traditional non-motoring dynamometer 64 for loading and a motor 34 for driving the rollers 16 offers a substantial economic benefit, over other similar devices that require a motor/electric dynamometer that is capable of both functions.

Generally, the motoring chassis dynamometer 10 is constructed such that in a preferred embodiment, the minimum first central axle 44 capacity is about 7,000 Kg, maximum vehicle speed is about 130 Kph, maximum power absorption is about 300 KW per dynamometer, maximum motorized power is about 60 KW at 65–100 Kph per motor, estimated net weight is about 4500 Kg, the frame 11 is made of heavy duty structural steel, the controlling and manipulating means is a conventional person computer system and the roller diameter for rollers 18, 20, 22, 24 is about 525 millimeters.

The chassis dynamometer of the present invention has many other applications aside from being used for performance testing for single drive axle vehicles. Thus, although the invention has been herein shown and described in what is perceived to be the most common embodiments, it is to be understood that the invention is not intended to be limited to the specific embodiments set forth above. Rather, it is recognized that certain modifications, substitutions, alterations and/or omissions may be made by one of skill in the art of the invention without departing from the spirit or intent of the invention. For example, multiple roller configurations may be used, including tandem-axle dynamometers or any number of drive axles ranging from four wheel drive vehicles through multiple axle military and off-road vehicles, each of which may benefit by testing using the same principles as described above. Accordingly, the invention is to be taken as including all reasonable equivalents to the subject matter of the appended claims and the foregoing description is meant to be exemplary only and should not limit the scope of the invention set forth in the following claims.

What is claimed is:

1. A motorized chassis dynamometer machine, comprising:

a frame assembly;

at least one roller assembly mounted on the frame assembly;

at least one motor assembly connected to each roller assembly for driving the roller assembly;

at least one loading dynamometer assembly capable of measuring power applied to each roller assembly;

at least one motor controller capable of controlling each motor assembly;

at least one dynamometer controller capable of controlling each dynamometer assembly; and a controller for controlling and manipulating each roller assembly, each motor controller and each dynamometer controller, wherein the motor assembly is only operable for driving each roller assembly and the dynamometer assembly is only operable for loading each roller assembly and not operable for driving each roller assembly.

2. A motorized chassis dynamometer machine of claim 1 wherein the frame assembly is a moveably frame assembly.

3. A motorized chassis dynamometer machine of claim 2, further comprising at least one roller assembly mounted on the moveable frame assembly.

4. A motorized chassis dynamometer machine of claim 1, further comprising a torque sensor for each motor assembly and each dynamometer assembly whereby measurement of torque reaction used to drive the roller is independently measured for each of the roller assemblies.

5. A motorized chassis dynamometer machine of claim 1, further comprising a speed sensor for each driven roll assembly is used to indicate the speed of each roller assembly.

6. A motorized chassis dynamometer machine of claim 1, wherein the motor assembly is connected to the dynamometer assembly.

7. A motorized chassis dynamometer machine of claim 1, wherein the dynamometer assembly is selected from a group consisting of but not limited to eddy current dynamometer assembly, friction dynamometer assembly, hydraulic dynamometer assembly and water break dynamometer assembly.

8. A motorized chassis dynamometer machine of claim 1, wherein the dynamometer assembly is capable of applying controlled and measurable resistance to determine the power output at each roller assembly.

9. A motorized chassis dynamometer machine of claim 1, wherein means of controlling and manipulating the machine utilizes one personal computer interfaced to motor controls and dynamometer loads controls.

10. A motorized chassis dynamometer machine of claim 1, wherein the motor assembly connected to each of the roller assembly is controlled at variable speeds.

11. A motorized chassis dynamometer machine of claim 1, wherein the speed, dynamometer torque and motor torque are used to control each roll assembly.

12. A motorized chassis dynamometer machine, comprising a fixed frame assembly;

a moveable frame assembly;

at least one roller assembly mounted on each of the fixed frame assembly and the moveable frame assembly;

at least one motor assembly connected to each roller assembly for driving the roller assembly;

at least one loading dynamometer assembly capable of measuring power applied to each roller assembly;

at least one motor controller capable of controlling each motor assembly;

at least one dynamometer controller capable of controlling each dynamometer assembly; and a controller for controlling and manipulating each roller assembly, each motor controller and each dynamometer controller; wherein the motor assembly is only operable for driving each roller assembly and the dynamometer assembly is only operable for loading each roller assembly and not operable for driving each roller assembly.

13. A motorized chassis dynamometer machine of claim 12, further comprising a torque sensor for each motor assembly and each dynamometer assembly whereby measurement of torque reaction used to drive the roller is independently measured for each roller assemblies.

14. A motorized chassis dynamometer machine of claim 12, further comprising a speed sensor for each driven roll assembly is used to independently indicate the speed of each roller assembly.

15. A motorized chassis dynamometer machine, comprising:

a frame assembly;

at least one roller assembly mounted to the frame assembly;

at least one motor assembly connected to each roller assembly for driven the roller assembly; and at least one loading dynamometer assembly capable of measuring power applied to each roller assembly;

a torque sensor for each motor assembly and each dynamometer assembly whereby measurement of torque reaction used to drive the roller is independently measured for each roller assembly;

at least one motor controller capable of controlling each dynamometer assembly; and a controller for receiving output from the torque sensor and controlling and manipulating each roller assembly, each motor controller and each dynamometer controller; wherein the motor assembly is one operable for driving each roller assembly and the dynamometer assembly is only operable for loading each roller assembly and not operable for driving each roller assembly.

16. A motorized chassis dynamometer machine of claim 15, further comprising a speed sensor for each driven roll assembly is used to independently indicate the speed of each roller assembly.

* * * * *